(12) United States Patent
Huang et al.

(10) Patent No.: US 12,080,908 B2
(45) Date of Patent: Sep. 3, 2024

(54) TOP COVER ASSEMBLY, SECONDARY BATTERY AND APPARATUS USING BATTERY

(71) Applicant: CONTEMPORARY AMPEREX TECHNOLOGY CO., LIMITED, Fujian (CN)

(72) Inventors: Siying Huang, Fujian (CN); Quankun Li, Fujian (CN); Shiyao Zhang, Fujian (CN); Jinmei Xu, Fujian (CN); Fenggang Zhao, Fujian (CN); Peng Wang, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 274 days.

(21) Appl. No.: 17/564,108

(22) Filed: Dec. 28, 2021

(65) Prior Publication Data
US 2022/0123417 A1   Apr. 21, 2022

Related U.S. Application Data

(63) Continuation of application No. PCT/CN2020/099503, filed on Jun. 30, 2020.

(30) Foreign Application Priority Data

Jul. 25, 2019  (CN) .......................... 201921183823.7

(51) Int. Cl.
*H01M 50/271* (2021.01)
*H01M 50/143* (2021.01)

(52) U.S. Cl.
CPC ....... *H01M 50/271* (2021.01); *H01M 50/143* (2021.01)

(58) Field of Classification Search
CPC ............ H01M 50/271; H01M 50/143; H01M 50/325; H01M 50/15; H01M 50/3425;
(Continued)

(56) References Cited

U.S. PATENT DOCUMENTS

| 3,516,870 A * | 6/1970 | Lutz ................... H01M 50/325 |
| | | 429/185 |
| 2010/0032039 A1* | 2/2010 | Nemoto .............. H01M 8/2465 |
| | | 137/843 |

(Continued)

FOREIGN PATENT DOCUMENTS

| CN | 201556648 | * | 8/2010 | .............. H01M 2/02 |
| CN | 201556648 U | | 8/2010 | |

(Continued)

OTHER PUBLICATIONS

Machine English translation of CN 201556648 (Year: 2010).*

(Continued)

*Primary Examiner* — Michael L Dignan
(74) *Attorney, Agent, or Firm* — Scully, Scott, Murphy & Presser, P.C.

(57) ABSTRACT

The present application relates to the field of an energy storage device, and more particularly, to a top cover assembly of a secondary battery, the secondary battery and an apparatus using a battery. The top cover assembly includes: a top cover sheet provided with an explosion-proof hole; an explosion-proof sheet, a position of the explosion-proof sheet corresponding to the explosion hole; and a fixing member, at least part of the fixing member being located between the top cover sheet and the explosion-proof sheet and connecting the top cover sheet and the explosion-proof sheet; where one of the explosion-proof hole and the fixing (Continued)

member is provided with a protrusion and the other is provided with a first groove, and the protrusion and the first groove are fixed.

12 Claims, 5 Drawing Sheets

(58) Field of Classification Search
CPC .......... H01M 2200/20; H01M 2220/20; Y02E 60/10
See application file for complete search history.

(56) References Cited

U.S. PATENT DOCUMENTS

| | | | | |
|---|---|---|---|---|
| 2016/0028057 | A1* | 1/2016 | Kanamori | H01M 50/3425 429/56 |
| 2016/0254508 | A1* | 9/2016 | Lee | H01M 10/0525 429/56 |
| 2017/0047565 | A1* | 2/2017 | Byun | H01M 50/578 |
| 2017/0149030 | A1* | 5/2017 | Lee | H01M 50/55 |
| 2018/0166676 | A1 | 6/2018 | Xing et al. | |
| 2018/0261806 | A1* | 9/2018 | Kawate | H01M 50/474 |
| 2020/0365858 | A1* | 11/2020 | Jaspers | F16K 17/403 |

FOREIGN PATENT DOCUMENTS

| | | |
|---|---|---|
| CN | 201616466 U | 10/2010 |
| CN | 201655859 U | 11/2010 |
| CN | 208507798 U | 2/2019 |
| CN | 208722933 U | 4/2019 |
| CN | 209880668 U | 12/2019 |
| WO | 2014195048 A1 | 12/2014 |

OTHER PUBLICATIONS

Extended European Search Report dated Aug. 1, 2022 received in European Patent Application No. EP 20844782.1.
International Search Report dated Oct. 13, 2020 issued in PCT/CN2020/099503.

* cited by examiner

FIG. 12 ance of the secondary battery is improved.
TOP COVER ASSEMBLY, SECONDARY BATTERY AND APPARATUS USING BATTERY This application is a continuation of International Application No. PCT/CN2020/099503, filed on Jun. 30, 2020, which claims priority to Chinese Patent Application No. 201921183823.7, filed to the Chinese Patent Office on Jul. 25, 2019 and entitled "TOP COVER ASSEMBLY AND SECONDARY BATTERY", both of which are incorporated herein by reference in their entireties.

TECHNICAL FIELD

An embodiment of the present application relates to the field of an energy storage device, and more particularly, to a top cover assembly of a secondary battery, the secondary battery and an apparatus using the battery.

BACKGROUND

The secondary battery serves as an important part of new energy vehicles, the safety performance of the secondary battery is extremely important. With the charging and discharging of the secondary battery, gas will be generated in the secondary battery, and excessive gas pressure may lead to thermal runaway so an explosion-proof sheet may be arranged on a top cover sheet of the secondary battery.

In the prior art, a top cover sheet is thin and is prone to deform in the manufacturing or carrying process, and the explosion-proof sheet is usually a metal sheet and is welded on the top cover sheet. Due to the inconsistent deformation or welding strength of the top cover sheet, the starting pressure of the explosion-proof sheet may fluctuate, so that the safety performance of the secondary battery is affected.

SUMMARY

According to various aspects of the present application, a top cover assembly of a secondary battery, the secondary battery and an apparatus using a battery are provided, so that the problem in the prior art is solved and the safety performance of the secondary battery is improved.

According to a first aspect of the present application, a top cover assembly of the secondary battery is provided. The top cover assembly of the secondary battery includes:

a top cover sheet, provided with an explosion-proof hole;

an explosion-proof sheet, a position of the explosion-proof sheet corresponding to the explosion-proof hole; and a fixing member, at least part of the fixing member being located between the top cover sheet and the explosion-proof sheet and connecting the top cover sheet and the explosion-proof sheet, where one of the explosion-proof hole and the fixing member is provided with a protrusion and the other is provided with a first groove, and the protrusion and the first groove are fixed.

As a possible design, the protrusion is arranged on one side of an inner wall of the explosion-proof hole facing towards a central axis of the explosion-proof hole; and the first groove is arranged on one side of the fixing member facing towards the top cover sheet.

As a possible design, the protrusion is located at the center of the inner wall of the explosion-proof hole along a height direction of the top cover assembly.

As a possible design, a second groove is arranged on one side of the fixing member facing towards the explosion-proof sheet;

the explosion-proof sheet includes a main body and a stretching-in portion located on an end part of the main body, and the stretching-in portion stretches into the second groove to be fixed; and a center line of the protrusion coincides with a center line of the stretching-into portion along a length direction of the top cover assembly.

As a possible design, the main body is provided with a nick; and a projection of the nick along a height direction of the top cover assembly is located inside an inner side of a projection of the fixing member along the height direction of the top cover assembly.

As a possible design, the explosion-proof sheet is located above the protrusion along a height direction of the top cover assembly.

As a possible design, a melting point of the explosion-proof sheet and/or the fixing member is 80° C.-300° C.

As a possible design, the explosion-proof sheet is a metal member, and the fixing member is a plastic member.

As a possible design, the explosion-proof sheet and the fixing member are integrally molded.

As a possible design, a sealing layer is arranged between the fixing member and the explosion-proof sheet and/or between the fixing member and the top cover sheet.

According to a second aspect of the present application, a secondary battery is provided. The secondary battery includes:

a housing, provided with an opening;

an electrode assembly, accommodated in the housing; and the top cover assembly described above, where the top cover assembly covers the opening to close the electrode assembly in the housing.

According to a third aspect of the present application, an apparatus using a battery is provided. The apparatus includes the secondary battery described above.

According to the top cover assembly of the secondary battery, the secondary battery and the apparatus using the battery described above, the fixing member is provided to connect the explosion-proof sheet and the top cove sheet, the explosion-proof and the fixing member are fixedly connected through the first groove and the protrusion, and the fixing member is connected to the explosion-proof sheet, so that the connection reliability of the explosion-proof sheet at the explosion-proof hole is enhanced, the sealing effect of the explosion-proof sheet is improved, fluctuation of a starting pressure of the explosion-proof sheet caused by welding is reduced, and the safety performance of the secondary battery is improved.

It should be understood that the above general description and the following detailed description are exemplary only and cannot limit the present application.

BRIEF DESCRIPTION OF THE DRAWINGS

To describe the technical solutions in the specific implementations of the present application or the prior art more clearly, the following briefly introduces the accompanying drawings required for describing the specific implementations or the prior art. Apparently, the accompanying drawings in the following description show merely some implementations of the present application, and a person of ordinary skill in the art may still derive other accompanying drawings from these accompanying drawings without creative efforts.

REFERENCE SIGNS

Top cover assembly;
11—Top cover sheet;
111—Explosion-proof hole;
112—Protrusion;
12—Explosion-proof sheet;
121—Main body;
121*a*—Nick;
122—Stretching-in portion;
13—Fixing member;
131—First groove;
132—Second groove;
14—Protective sheet;
15—Sealing layer;
2—Housing;
100—Vehicle;
200—Battery group.

The accompanying drawings, which are incorporated in and constitute a part of this specification, illustrate embodiments consistent with the present application and, together with the description, serve to explain the principles of the present application.

DESCRIPTION OF EMBODIMENTS

The technical solutions of the present application are clearly and completely described below with reference to the accompanying drawings. Apparently, the described embodiments are merely some rather than all of the embodiments of the present application. All other examples obtained by those of ordinary skill in the art based on the embodiments of the present application without creative efforts should fall within the protection scope of the present application.

Terms used in the embodiments of the present application are only for describing specific embodiments, and are not intended to limit the present application. As used in the embodiments of the present application and the appended claims, the singular forms "a", "the" and "this" are intended to include the plural forms, unless the context clearly indicates other meanings.

It should be understood that the term "and/or" used herein merely describes an association relationship between associated objects, and it indicates three types of relationships. For example, A and/or B may indicate that A exists alone, A and B coexist, or B exists alone. In addition, the character "/" herein generally denote that the former and latter associated objects are in an "or" relationship.

It should be understood that azimuth words such as "upper", "lower", "left", "right" and the like described in the embodiment of the present application are described from the angle of the accompanying drawings, and should not be understood as a limitation of the embodiment of the present application. In addition, in the context, it should be understood that when it is mentioned that one component is connected "above" or "below" another component, the component can be directly connected "above" or "below" another component, and may be indirectly connected "above" or "below" another component through an intermediate component.

Figure 1:
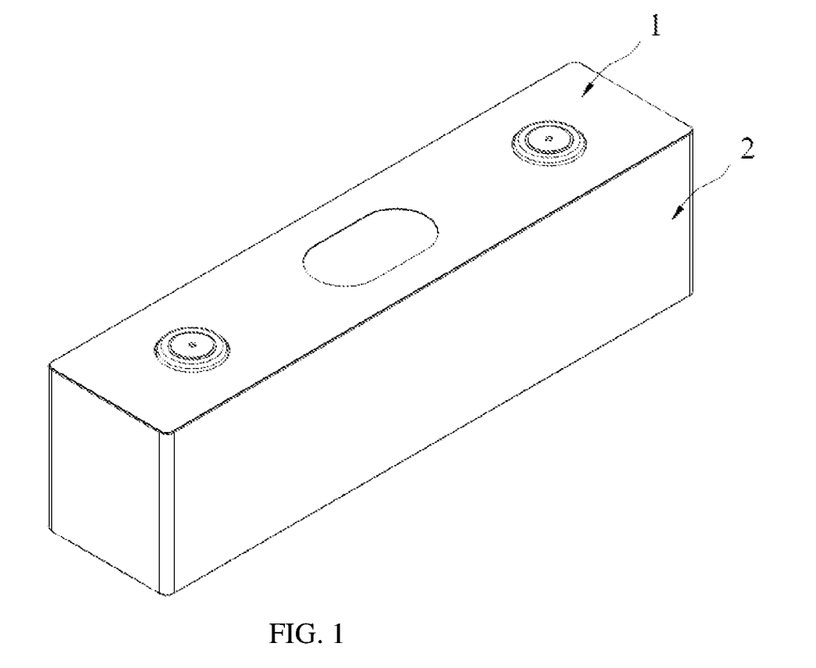
FIG. 1 is a structural schematic diagram of a secondary battery according to an embodiment of the present application.

FIG. 1 is a structural schematic diagram of a secondary battery according to an embodiment of the present application. As shown in FIG. 1, the embodiment of the present application provides a secondary battery, including a housing 2, an electrode assembly and a top cover assembly 1.

The housing 2 may be of a hexahedron and may also be of other shapes, and an accommodating cavity is formed in the housing 2 for accommodating the electrode assembly and electrolyte. One end of the housing 2 is provided with an opening, so that the electrode assembly may be placed in the accommodating cavity of the housing 2 through the opening. A plurality of electrode assemblies may be arranged in the accommodating cavity and are mutually stacked. The housing 2 may be made of a metal material, such as aluminum, aluminum alloy or nickel-plated steel.

The electrode assembly includes an electrode unit, where the electrode unit includes a positive electrode piece, a negative electrode piece and a separator; and the separator is located between the adjacent positive electrode piece and negative electrode piece and configured to separate the positive electrode piece from the negative electrode piece.

In a possible design, the positive electrode piece, the separator and the negative electrode piece are sequentially stacked and wound to form an electrode unit of the electrode assembly, that is, the electrode unit has a winding structure. In another possible design, the positive electrode piece, the separator and the negative electrode piece are sequentially stacked to form an electrode unit of the electrode assembly, and the electrode unit has a laminated structure. Meanwhile, there is a gap after the electrode unit is formed, and electrolyte can enter the electrode unit through the gap to infiltrate the positive electrode piece and the negative electrode piece.

The negative electrode piece includes a negative current collector (such as a copper foil) and a negative active material layer (such as carbon or silicon) coating a surface of the negative current collector. The positive electrode piece includes a positive current collector (such as an aluminum foil) and a positive active material layer (such as a ternary material, lithium iron phosphate or lithium cobalt oxide) coating a surface of the positive current collector. A positive electrode tab is connected to the positive electrode piece and stretches out of the electrode unit, and the positive electrode tab may be directly cut by the positive current collector. A negative electrode tab is connected to the negative electrode piece and stretches out of the electrode unit, and the negative electrode tab may be directly cut by the negative current collector.

The top cover assembly 1 includes a top cover sheet 11 and two electrode terminals, where the top cover sheet 11 is shaped like a flat plate and has approximately the same size and shape as those of the opening of the housing 2, and the top cover sheet 11 is fixed at the opening of the housing 2, so that the electrode assembly and the electrolyte are closed in the accommodating cavity of the housing 2. The top cover sheet 11 is made of a metal material. Exemplarily, the top cover sheet 11 may select the same metal material as the housing 2, such as aluminum, steel and the like In this embodiment, the top cover sheet 11 is provided with two electrode leading-out holes, and the electrode terminals are arranged at the electrode leading-out holes of the top cover sheet 11.

In the two electrode terminals, one is a positive electrode terminal and the other is a negative electrode terminal. The positive electrode terminal and the positive electrode tab are electrically connected through an adapter sheet, and the negative electrode terminal and the negative electrode table are electrically connected through an adapter sheet.

Figure 2:
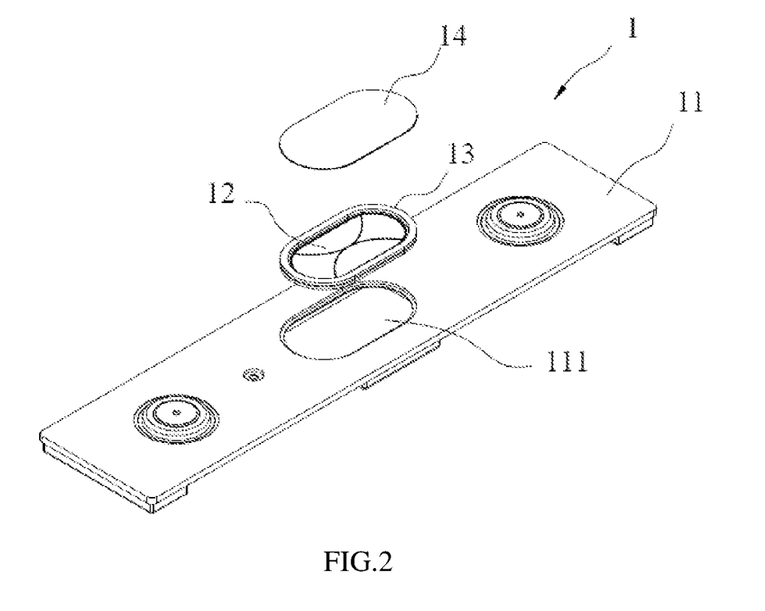
FIG. 2 is a schematic diagram of a first structure of a top cover assembly according to an embodiment of the application.
Figure 3:
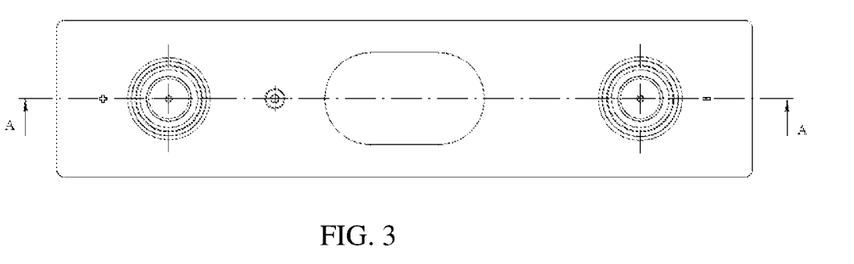
FIG. 3 is a top view of a first structure of a top cover assembly according to an embodiment of the present application.
Figure 4:
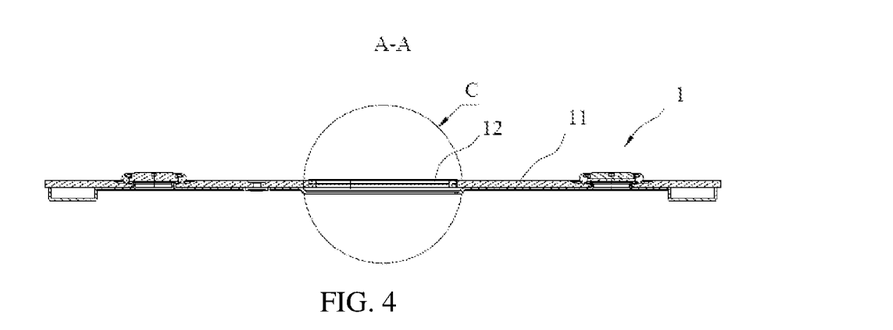
FIG. 4 is a sectional view in an A-A direction in FIG. 3.
Figure 5:
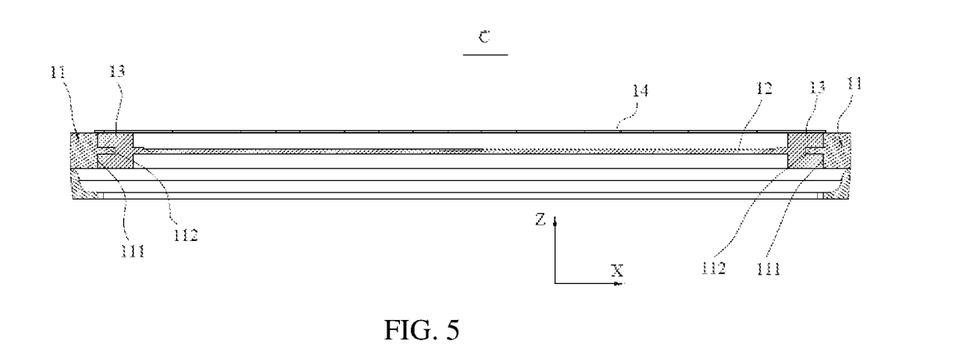
FIG. 5 is an enlarged view of a position C in FIG. 4.
Figure 6:
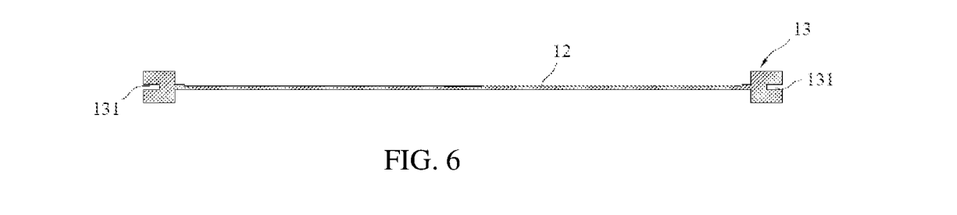
FIG. 6 is a schematic diagram of connection between an explosion-proof sheet and a fixing member in a first structure of a top cover assembly according to an embodiment of the present application.

FIG. 2 is a schematic diagram of first structure of a top cover assembly according to an embodiment of the application; FIG. 3 is a top view of a first structure of a top cover assembly according to an embodiment of the present application; FIG. 4 is a sectional view in an A-A direction in FIG. 3; FIG. 5 is an enlarged view of a position C in FIG. 4; and FIG. 6 is a schematic diagram of connection between an explosion-proof sheet and a fixing member in a first structure of a top cover assembly according to an embodiment of the present application.

As shown in FIG. 2, the top cover sheet 11 is provided with an explosion-proof hole 111, the top cover assembly 1 further includes an explosion-proof sheet 12, and the position of the explosion-proof sheet 12 corresponds to the explosion-proof hole 111. The explosion-proof sheet 12 is arranged at an approximately middle position of the top cover sheet 11. When gas generated by overcharging, overdischarging or overheating of the battery makes the internal pressure of the secondary battery too high, the explosion-proof sheet 12 may be damaged, so that the gas formed in the secondary battery may be discharged outside, and explosion of the secondary battery can be prevented.

The top cover assembly 1 further includes a fixing member 13, where at least part of the fixing member 13 is located between the top cover sheet 11 and the explosion-proof sheet 12 and connects the top cover sheet 11 and the explosion-proof sheet 12. As shown in FIG. 3 to FIG. 6, one of the explosion-proof hole 111 and the fixing member 13 is provided with a protrusion 112 and the other is provided with a first groove 131, and the protrusion 112 and the first groove 131 are fixed.

The explosion-proof hole 111 and the fixing member 13 are fixedly connected through the first groove 131 and the protrusion 112, and the fixing member 13 is connected to the explosion-proof sheet 12, so that the connection reliability of the explosion-proof sheet 12 at the explosion-proof hole 111 is enhanced, the sealing effect of the explosion-proof 12 is improved, fluctuation of a starting pressure of the explosion-proof sheet 12 caused by welding of the explosion-proof sheet 12 may be avoided, and the safety performance of the secondary battery is improved.

As a possible implementation, the protrusion 112 may be integrally arranged on an inner wall of the explosion-proof hole 111, the protrusion 112 is arranged on one side of an inner wall of the explosion-proof hole 111 facing towards a central axis of the explosion-proof hole 111, the first groove 131 may be integrally molded on the fixing member 13, and the first groove 131 is formed on one side of the fixing member 13 facing towards the top cover sheet 11. In this way, the fixing member 13 is located in the explosion-proof hole 111, too much space of the secondary battery is not occupied, and the energy density of the secondary battery is increased.

The protrusion 112 may be arranged at any position of the inner wall of the explosion-proof hole 111. As a possible implementation, the protrusion 112 is located at the center position of the inner wall of the explosion-proof hole 111 along the height direction (Z) of the top cover assembly 1. In this way, one part of the fixing member 13 located above the protrusion 112 and one part of the fixing member 13 located below the protrusion 112 have substantially the same thickness, and the fixing member 13 has uniform thickness, so that the fixing member 13 will not be too thin at the top or at the bottom, and different fastening degrees of the explosion-proof sheet 12 will cause the explosion-proof sheet 12 to tend to deform towards the thinner side of the fixing member 13. In this embodiment, the protrusion 112 is located at the center position of the inner wall of the explosion-proof hole 111, so that the explosion-proof sheet 12 is not prone to deform upwards or downwards, and the sealing property of the explosion-proof sheet 12 is ensured.

Furthermore, the protrusion 112 is located at the center position of the inner wall of the explosion-proof hole 111, and one part of the fixing member 13 located above the protrusion 112 and one part of the fixing member 13 located below the protrusion 112 have substantially the same thickness, so that the connection strength of the fixing member 13 can be enhanced. Even if under the condition of stress, the fixing member 13 will not be damaged, so that the sealing property between the fixing member 13 and the top cover sheet 11 deteriorates or the fixing member 13 and the top cover sheet 11 are separated.

Figure 7:
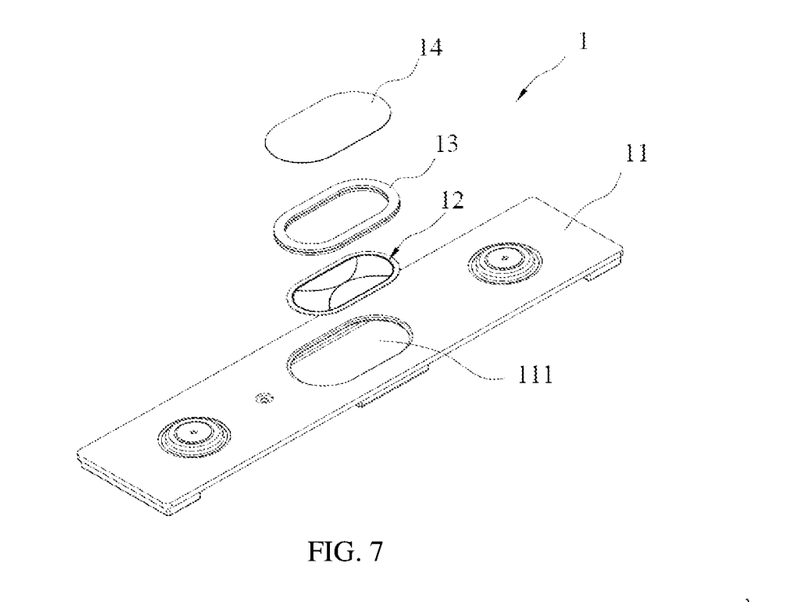
FIG. 7 is a schematic diagram of a second structure of a top cover assembly according to an embodiment of the application.
Figure 8:
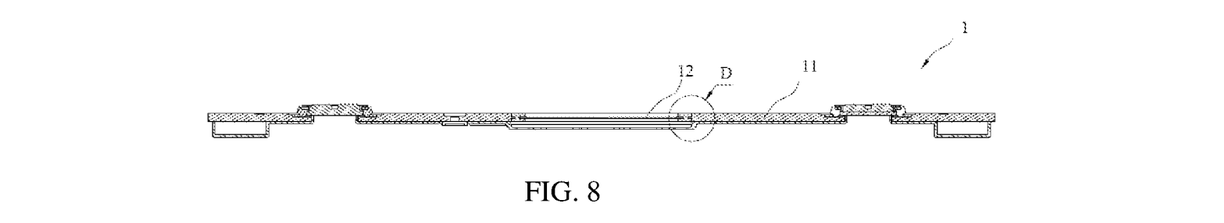
FIG. 8 is a sectional view of a second structure of a top cover assembly according to an embodiment of the application.
Figure 9:
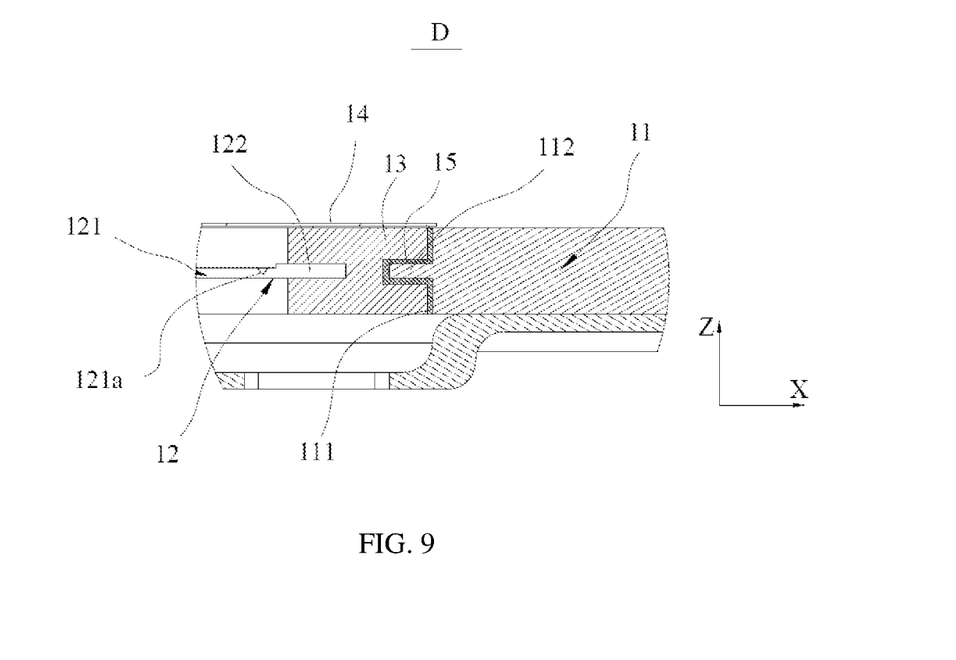
FIG. 9 is an enlarged view of a position D in FIG. 8.
Figure 10:
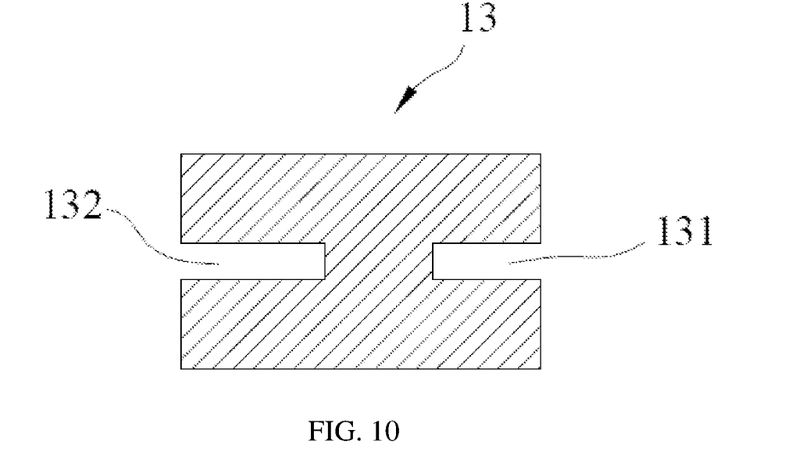
FIG. 10 is a structural schematic diagram of a fixing member in a top cover assembly according to an embodiment of the application.
Figure 11:
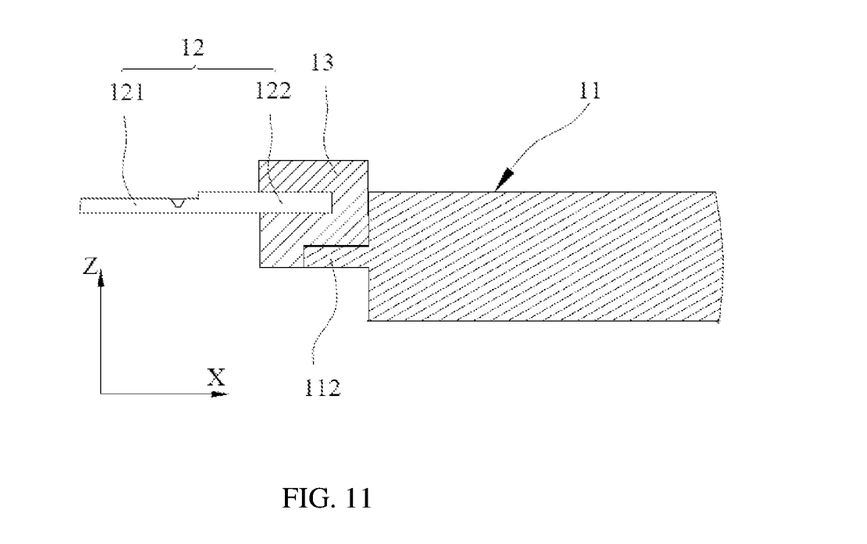
FIG. 11 is a schematic diagram of a position relation between an explosion-proof sheet and a top cover sheet in a top cover assembly according to an embodiment of the present application.

FIG. 7 is a schematic diagram of a second structure of a top cover assembly according to an embodiment of the application; FIG. 8 is a sectional view of a second structure of a top cover assembly according to an embodiment of the application; FIG. 9 is an enlarged view of a position Din FIG. 8; FIG. 10 is a structural schematic diagram of a fixing member in a top cover assembly according to an embodiment of the application; and FIG. 11 is a schematic diagram of a position relation between an explosion-proof sheet and a top cover sheet in a top cover assembly according to an embodiment of the present application.

The fixing member 13 and the explosion-proof sheet 12 may be connected through many ways, for example, they may be fixed through adhesion. As shown in FIG. 7 to FIG. 10, as a possible implementation, a second groove 132 (referring to FIG. 10) is formed on one side of the fixing member 13 facing towards the explosion-proof sheet 12. The explosion-proof sheet 12 includes a main body 121 and a stretching-in portion 122 (referring to FIG. 9) located on an end part of the main body 121, and the stretching-in portion 122 stretches into the second groove 132 to be fixed. The connection strength between the explosion-proof sheet 12 and the fixing member 13 can be further improved through cooperation of the stretching-in portion 122 and the second groove 132. A center line of the protrusion 112 coincides with a center line of the stretching-into portion 122 along a length direction (X) of the top cover assembly 1. Therefore, the protrusion 112 is basically aligned with the stretching-in portion 122, one part of the fixing member 13 located above the protrusion 112 and the stretching-in portion 122 and one part of the fixing member 13 located below the protrusion 112 and the protrusion 112 have substantially the same thickness, and the fixing member 13 has uniform thickness, so that the fixing member 13 will not be too thin at the top or at the bottom, and different fastening degrees of the explosion-proof sheet 12 will cause the explosion-proof sheet 12 to tend to deform towards the thinner side of the fixing member 13. In this embodiment, the protrusion 112 is provided, so that the explosion-proof sheet 12 is not prone to deform upwards or downwards, and the sealing property of the explosion-proof sheet 12 is ensured.

Furthermore, the center line of the protrusion 112 coincides with the center line of the stretching-in portion 122 and is located at the center position of the inner wall of the explosion-proof hole 111, and one part of the fixing member 13 located above the stretching-in portion 122 and one part of the fixing member 13 located below the stretching-in portion 122 have substantially the same thickness, so that the connection strength of the fixing member 13 and the explosion-proof sheet 12 can be enhanced. Even if under the condition of stress, the fixing member 13 will not be damaged, so that the sealing property between the fixing member 13 and the explosion-proof sheet 12 deteriorates or the fixing member 13 and the explosion-proof sheet 12 are separated.

As a possible implementation, a thickness of the stretching-in portion 122 is greater than a thickness of the main body 121 along the height direction (Z) of the top cover assembly 1. Of course, the thickness of the stretching-in portion 122 may also be equal to the thickness of the main body 121, or less than the thickness of the main body 121. The thickness of the stretching-in portion 122 is relatively large, so that the connection strength between the stretching-in portion 122 and the fixing member 13 can be improved.

As a possible implementation, as shown in FIG. 9, the main body 121 is provided with a nick 121a. When the internal pressure of the secondary battery is too high, the explosion-proof sheet 12 can be easily damaged along the nick 121a. In this embodiment, the projection of the nick 121a along the height direction (Z) of the top cover assembly 1 falls within the inner side of the projection of the fixing member 13 along the height direction (Z) of the top cover assembly 1. In this way, the nick 121a is not blocked by the fixing member 13. When the internal pressure of the secondary battery reaches a certain value, the breakage of the explosion-proof sheet 12 along the nick 121a will not be affected by the fixing member 13, so that the safety performance of the secondary battery is ensured.

The explosion-proof sheet 12 may be located below the protrusion 112, or may also be located above the protrusion 112. As a possible implementation, the explosion-proof sheet 12 is located above the protrusion 112 along the height direction Z of the top cover assembly 1. As shown in FIG. 11, when the explosion-proof sheet 12 is located above the protrusion 112, an outer diameter of the explosion-proof sheet 12 is greater than an inner diameter of the protrusion 112. In this embodiment, the protrusion 112 forms a ring-shaped structure on the inner wall of the explosion-proof hole 111, and the inner diameter of the protrusion 112 refers to an inner diameter of a ring surrounded by an end part of one end of the protrusion 112 away from the top cover sheet 11. The explosion-proof sheet 12 is located above the protrusion 112. When the internal gas pressure of the secondary battery reaches a certain value, the explosion-proof sheet 12 is broken and falls off, but can be blocked by the protrusion 112, so that the explosion-proof sheet will not fall into the secondary battery, and the performance of the secondary battery will not be affected. Moreover, if the fixing member 13 is melted when the internal temperature of the secondary battery reaches a certain value, the explosion-proof sheet 12 will not fall into the secondary battery when being blocked by the protrusion 112.

As a possible implementation, the melting point of the explosion-proof sheet 12 and/or the fixing member 13 is 80° C.-300° C. When the internal temperature of the secondary battery reaches a certain value, even if the internal gas pressure of the secondary battery cannot open the explosion-proof sheet 12, the explosion-proof sheet 12 and/or the fixing member 13 can be melted, so that the secondary battery can be discharged successfully, and the safety performance of the secondary battery is further improved. If the explosion-proof sheet 12 can be opened only when the pressure exceeds a certain value, energy inside the secondary battery has often accumulated too much, and it is too late to release the energy. In this embodiment, the explosion-proof 12 not only can respond to the internal pressure of the secondary battery, but also can release energy when the internal temperature of the secondary battery is too high, so as to achieve the effect of controlling the temperature and the gas pressure at the same time, so the safety performance is better. In the top cover assembly 1 provided by the embodiment of the present application, the top cover sheet 11 is provided with the explosion-proof hole 111. The explosion-proof sheet 12 arranged in the explosion-proof hole 111 not only can respond to the internal pressure of the secondary battery, but also can respond to the internal temperature of the secondary battery. There is no need to additionally provide other holes to respond to the pressure and temperature respectively, so that the space of the top cover sheet 11 is effectively utilized. The explosion-proof hole 111 may be opened large enough, and the open area can be increased as much as possible, so that discharge of heat and gas is accelerated, and the safety response speed of the secondary battery is increased.

As a possible implementation, the explosion-proof sheet 12 is a metal member, the fixing member 13 is a plastic member, and the explosion-proof sheet 12 and the fixing member 13 are of split structures (as shown in FIG. 7). When the internal temperature of the secondary battery reaches a certain value, the fixing member 13 can be melted, so that the explosion-proof sheet 12 falls off. When the internal pressure of the secondary battery reaches a certain value, the explosion-proof sheet 12 can be broken. Since plastic is greatly affected by the temperature, the explosion-proof sheet 12 is set as a metal sheet, for example, may be an aluminum sheet. The fixing member 13 is set as a plastic member, and the water permeation preventing property and electrolyte permeation preventing property of the metal sheet are higher, so that the water permeation preventing property of the explosion-proof sheet 12 is improved, and the safety performance of the secondary battery is improved. Furthermore, when the internal gas pressure of the secondary battery reaches a certain value, the bursting of the metal sheet will not be affected by the temperature, thereby preventing the explosion-proof sheet 12 from being opened under the pressure.

As a possible implementation, the explosion-proof sheet 12 and the fixing member 13 are integrally molded (as shown in FIG. 2), and the explosion-proof sheet 12 and the fixing member 13 may adopt integrated injection molding. When the internal temperature of the secondary battery reaches a certain value, both the fixing member 13 and the explosion-proof sheet 12 can be melted, so that the explosion-proof sheet 12 and/or the fixing member 13 fall off. When the internal pressure of the secondary battery reaches a certain value, the explosion-proof sheet 12 can be broken. The explosion-proof sheet 12 and the fixing member 13 are integrally molded, so the structure of the top cover assembly 1 is simplified and the processing process is easier to implement.

Specifically, a material of the explosion-proof sheet 12 and/or the fixing member 13 may be one or more than two of polypropylene, ethylene propylene diene monomer rubber, polyethylene, polytetrafluoroethylene, polyphenylene sulfide or polyetheretherketone.

As a possible implementation, a sealing layer 15 is arranged between the fixing member 13 and the explosion-proof sheet 12 and/or the fixing member 13 and the top cover sheet 11, referring to FIG. 9. The sealing layer 15 may be formed between the plastic member and the metal member through a nano molding technology (NMT), so that the sealing property of the secondary battery is improved.

As a possible implementation, referring to FIG. 9, the top cover assembly 1 further includes a protective sheet 14, and the protective sheet 14 covers a connecting interface between the fixing member 13 and the top cover sheet 11 to prevent the electrolyte from damaging the connecting interface between the fixing member 13 and the top cover sheet 11, so that the sealing property of the secondary battery can be further improved.

An embodiment of the present application further provides a secondary battery, including a housing 2, a battery assembly and the top cover assembly 1 provided by any embodiment of the present application. The housing 2 is provided with an opening, the electrode assembly is accommodated in the housing 2, and the electrode assembly includes a first electrode piece, a second electrode piece and a spacer arranged between the first electrode piece and the second electrode piece. The top cover assembly 1 covers the above opening so as to close the electrode assembly in the housing 2.

Figure 12:
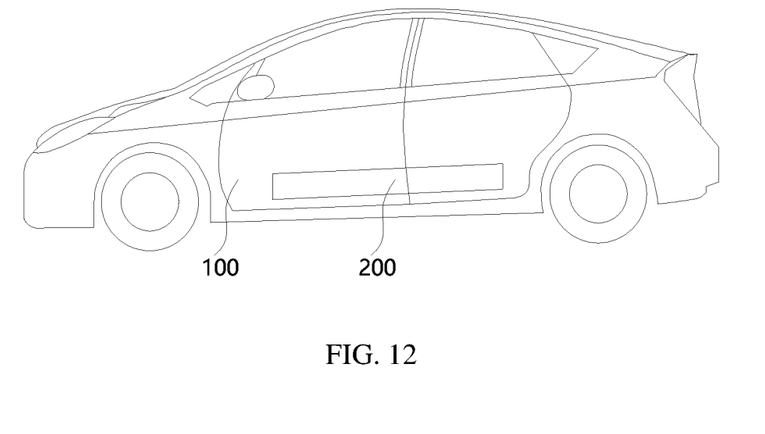
FIG. 12 is a structural schematic diagram of an apparatus using a battery according to another embodiment of the present application.

Another embodiment of the present application provides an apparatus using a battery. For example, the apparatus using the battery may be a vehicle, such as a new energy vehicle. The apparatus using the battery includes the secondary battery described by the above embodiment. For example, as shown in FIG. 12, which is a structural schematic diagram of the apparatus using the battery according to another embodiment of the present application, the apparatus using the battery may be a vehicle 100. The vehicle 100 may be fuel vehicle, a gas vehicle or a new energy vehicle. The new energy vehicle may be a battery electric vehicle, a hybrid electric vehicle or an extended-range vehicle. A battery group 200 may be arranged in the vehicle 100. For example, the battery group 200 may be arranged at the bottom or head or tail of the vehicle 100. The battery group 200 may be used to supply power for the vehicle 100. For example, the battery group 200 may serve as an operating power supply of the vehicle 100 and may be applied to a circuit system of the vehicle 100, for example, the battery group 200 may be applied to the working power requirements during starting, navigation and operation of the vehicle 100. In another embodiment of the present application, the battery group 200 not only may serve as an operating power supply of the vehicle 100, but also may serve as a driving power supply of the vehicle 100 to replace or partially replace fuel oil or natural gas to provide driving power for the vehicle 100.

In order to meet different power demands, the battery group 200 may include one battery module or a plurality of battery modules, where the plurality of battery modules may be connected in series or in parallel or in a mixed manner, and the mixed manner refers to mixing of connection in series and in parallel. One battery module includes one or more secondary batteries described by the aforementioned embodiments and the plurality of secondary batteries may be connected in series or in parallel or in a mixed manner.

In summary, according to the top cover assembly of the secondary battery and the secondary battery provided by the embodiments of the present application, the explosion-proof hole and the fixing member are fixedly connected through the first groove and the protrusion, and the fixing member is connected to the explosion-proof sheet, so that the connection reliability of the explosion-proof sheet at the explosion-proof hole is enhanced, the sealing effect of the explosion-proof sheet is improved, the possibility of deformation of the top cover sheet is reduced, and the safety performance of the secondary battery is improved.

The above are only preferred embodiments of the application, and are not used to limit the application. For those skilled in the art, the application can have various modifications and changes. Any modifications, equivalent substitutions, improvements, and the like within the spirit and principles of the application are intended to be included within the scope of the present application.

What is claimed is:

1. A top cover assembly of a secondary battery, the top cover assembly comprising:
   a top cover sheet provided with an explosion-proof hole;
   an explosion-proof sheet, a position of the explosion-proof sheet corresponding to the explosion-proof hole; and
   a fixing member, at least part of the fixing member being located between the top cover sheet and the explosion-proof sheet and connecting the top cover sheet and the explosion-proof sheet,
   wherein one of the explosion-proof hole and the fixing member is provided with a protrusion and the other is provided with a first groove,
   the protrusion and the first groove are fixed,
   the protrusion is arranged on one side of an inner wall of the explosion-proof hole facing towards a central axis of the explosion-proof hole, the first groove is arranged on one side of the fixing member facing towards the top cover sheet, a second groove is arranged on one side of the fixing member facing towards the explosion-proof sheet, the explosion-proof sheet comprises a main body and a stretching-into portion located on an end part of the main body, and the stretching-into portion stretches into the second groove to be fixed;
   the protrusion is located at a center of the inner wall of the explosion-proof hole along a height direction of the top cover assembly; and
   a center line of the protrusion coincides with a center line of the stretching-into portion along a length direction of the top cover assembly.

2. The top cover assembly according to claim 1, wherein a thickness of the stretching-in portion is greater than a thickness of the main body along a height direction of the top cover assembly.

3. The top cover assembly according to claim 1, wherein the main body is provided with a nick; and a projection of the nick along a height direction of the top cover assembly is located inside an inner side of a projection of the fixing member along the height direction of the top cover assembly.

4. The top cover assembly according to claim 1, wherein the explosion-proof sheet is located above the protrusion along a height direction of the top cover assembly.

5. The top cover assembly according to claim 1, wherein a melting point of the explosion-proof sheet and/or the fixing member is 80° C.-300° C.

6. The top cover assembly according to claim 5, wherein the explosion-proof sheet and the fixing member are integrally molded.

7. The top cover assembly according to claim 1, wherein the explosion-proof sheet is a metal member, and the fixing member is a plastic member.

8. The top cover assembly according to claim 7, wherein the explosion-proof sheet and the fixing member are of split structures.

9. The top cover assembly according to claim 1, wherein a sealing layer is arranged between the fixing member and the explosion-proof sheet and/or between the fixing member and the top cover sheet.

10. The top cover assembly according to claim 1, wherein the top cover assembly further comprises a protective sheet, and the protective sheet is configured to cover a connecting interface between the fixing member and the top cover sheet.

11. A secondary battery, comprising:
a housing provided with an opening;
an electrode assembly accommodated in the housing; and
the top cover assembly of claim 1, wherein the top cover assembly covers the opening to close the electrode assembly in the housing.

12. An apparatus using a battery, the apparatus comprising the secondary battery of claim 11.

\* \* \* \* \*